N. TESLA.
VALVULAR CONDUIT.
APPLICATION FILED FEB. 21, 1916. RENEWED JULY 8, 1919.
1,329,559.
Patented Feb. 3, 1920.
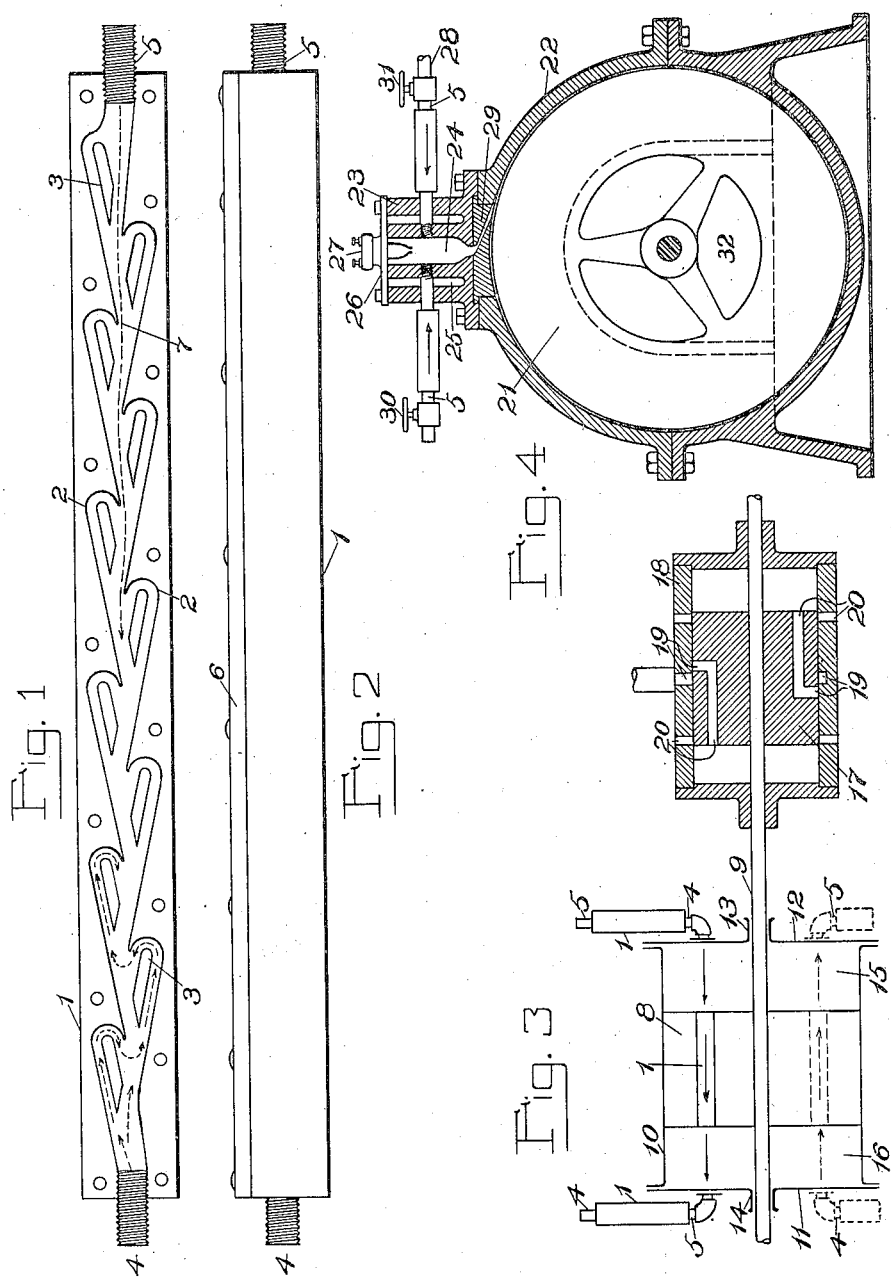
INVENTOR
Nikola Tesla
BY
Kerr, Page, Cooper & Hayward
ATTORNEYS

ID OFFICE.

UNITED STATES PATENT OFFICE.

NIKOLA TESLA, OF NEW YORK, N. Y.

VALVULAR CONDUIT.

1,329,559.  Specification of Letters Patent.  Patented Feb. 3, 1920.

Application filed February 21, 1916, Serial No. 79,703. Renewed July 8, 1919. Serial No. 309,482.

*To all whom it may concern:*

Be it known that I, NIKOLA TESLA, a citizen of the United States, residing at New York, in the county and State of New York, have invented certain new and useful Improvements in Valvular Conduits, of which the following is a full, clear, and exact description.

In most of the machinery universally employed for the development, transmission and transformation of mechanical energy, fluid impulses are made to pass, more or less freely, through suitable channels or conduits in one direction while their return is effectively checked or entirely prevented. This function is generally performed by devices designated as valves, comprising carefully fitted members the precise relative movements of which are essential to the efficient and reliable operation of the apparatus. The necessity of, and absolute dependence on these, limits the machine in many respects, detracting from its practical value and adding greatly to its cost of manufacture and maintenance. As a rule the valve is a delicate contrivance, very liable to wear and get out of order and thereby imperil ponderous, complex and costly mechanism and, moreover, it fails to meet the requirements when the impulses are extremely sudden or rapid in succession and the fluid is highly heated or corrosive.

Though these and other correlated facts were known to the very earliest pioneers in the science and art of mechanics, no remedy has as yet been found or proposed to date so far as I am aware, and I believe that I am the first to discover or invent any means, which permit the performance of the above function without the use of moving parts, and which it is the object of this application to describe.

Briefly expressed, the advance I have achieved consists in the employment of a peculiar channel or conduit charactized by valvular action.

The invention can be embodied in many constructions greatly varied in detail, but for the explanation of the underlying principle it may be broadly stated that the interior of the conduit is provided with enlargements, recesses, projections, baffles or buckets which, while offering virtually no resistance to the passage of the fluid in one direction, other than surface friction, constitute an almost impassable barrier to its flow in the opposite sense by reason of the more or less sudden expansions, contractions, deflections, reversals of direction, stops and starts and attendant rapidly succeeding transformations of the pressure and velocity energies.

For the full and complete disclosure of the device and of its mode of action reference is made to the accompanying drawings in which—

Figure 1 is a horizontal projection of such a valvular conduit with the top plate removed.

Fig. 2 is side view of the same in elevation.

Fig. 3 is a diagram illustrative of the application of the device to a fluid propelling machine such as, a reciprocating pump or compressor, and Fig. 4 is a plan showing the manner in which the invention is, or may be used, to operate a fluid propelled rotary engine or turbine.

Referring to Fig. 1, 1 is a casing of metal or other suitable material which may be cast, milled or pressed from sheet in the desired form. From its side-walls extend alternatively projections terminating in buckets 2 which, to facilitate manufacture are congruent and spaced at equal distances, but need not be. In addition to these there are independent partitions 3 which are deemed of advantage and the purpose of which will be made clear. Nipples 4 and 5, one at each end, are provided for pipe connection. The bottom is solid and the upper or open side is closed by a fitting plate 6 as shown in Fig. 2. When desired any number of such pieces may be joined in series, thus making up a valvular conduit of such length as the circumstances may require.

In elucidation of the mode of operation let it be assumed that the medium under pressure be admitted at 5. Evidently, its approximate path will be as indicated by the dotted line 7, which is nearly straight, that is to say, if the channel be of adequate cross-section, the fluid will encounter a very small resistance and pass through freely and undisturbed, at least to a degree. Not so if the entrance be at the opposite end 4. In this case the flow will not be smooth and continuous, but intermittent, the fluid being quickly deflected and reversed in direction, set in whirling motion, brought to rest and again accelerated, these processes following one another in rapid succession. The partitions 3 serve to direct the stream upon the buckets and to intensify the actions causing violent surges and eddies which interfere very materially with the flow through the conduit. It will be readily observed that the resistance offered to the passage of the medium will be considerable even if it be under constant pressure, but the impediments will be of full effect only when it is supplied in pulses and, more especially, when the same are extremely sudden and of high frequency. In order to bring the fluid masses to rest and to high velocity in short intervals of time energy must be furnished at a rate which is unattainable, the result being that the impulse cannot penetrate very far before it subsides and gives rise to movement in the opposite direction. The device not only acts as a hinderment to the bodily return of particles but also, in a measure, as a check to the propagation of a disturbance through the medium. Its efficacy is chiefly determined; first, by the magnitude of the ratio of the two resistances offered to disturbed and to undisturbed flow, respectively, in the directions from 4 to 5 and from 5 to 4, in each individual element of the conduit; second, by the number of complete cycles of action taking place in a given length of the valvular channel and, third, by the character of the impulses themselves. A fair idea may be gained from simple theoretical considerations.

Examining more closely the mode of operation it will be seen that, in passing from one to the next bucket in the direction of disturbed flow, the fluid undergoes two complete reversals or deflections through 180 degrees while it suffers only two small deviations from about 10 to 20 degrees when moving in the opposite sense. In each case the loss of head will be proportionate to a hydraulic coefficient dependent on the angle of deflection from which it follows that, for the same velocity, the ratio of the two resistances will be as that of the two coefficients. The theoretical value of this ratio may be 200 or more, but must be taken as appreciably less although the surface friction too is greater in the direction of disturbed flow. In order to keep it as large as possible, sharp bonds should be avoided, for these will add to both resistances and reduce the efficiency. Whenever practicable, the piece should be straight; the next best is the circular form.

That the peculiar function of such a conduit is enhanced by increasing the number of buckets or elements and, consequently, cyclic processes in a given length is an obvious conclusion, but there is no direct proportionality because the successive actions diminish in intensity. Definite limits, however, are set constructively and otherwise to the number of elements per unit length of the channel, and the most economical design can only be evolved through long experience.

Quite apart from any mechanical features of the device the character of the impulses has a decided influence on its performance and the best results will be secured, when there are produced at 4, sudden variations of pressure in relatively long intervals, while a constant pressure is maintained at 5. Such is the case in one of its most valuable industrial applications which will be specifically described.

In order to conduce to a better understanding, reference may first be made to Fig. 3 which illustrates another special use and in which 8 is a piston fixed to a shaft 9 and fitting freely in a cylinder 10. The latter is closed at both ends by flanged heads 11 and 12 having sleeves or stuffing boxes 13 and 14 for the shaft. Connection between the two compartments, 15 and 16, of the cylinder is established through a valvular conduit and each of the heads is similarly equipped. For the sake of simplicity these devices are diagrammatically shown, the solid arrows indicating the direction of undisturbed flow. An extension of the shaft 9 carries a second piston 17 accurately ground to and sliding easily in a cylinder 18 closed at the ends by plates and sleeves as usual. Both piston and cylinder are provided with inlet and outlet ports marked, respectively, 19 and 20. This arrangement is familiar, being representative of a prime mover of my invention, termed "mechanical oscillator", with which it is practicable to vibrate a system of considerable weight many thousand times per minute.

Suppose now that such rapid oscillations are imparted by this or other means to the piston 8. Bearing in mind the proceeding, the operation of the apparatus will be understood at a glance. While moving in the direction of the solid arrow, from 12 to 11, the piston 8 will compress the air or other medium in the compartment 16 and expel it from the same, the devices in the piston and head 11 acting, respectively, as closed and open valves. During the movement of the piston in the opposite direction, from 11 to 12, the medium which has meanwhile filled the chamber 15 will be transferred to compartment 16, egress being prevented by the device in head 12 and that in the piston allowing free passage. These processes will be repeated in very quick succession. If the nipples 4 and 5 are put in communication with independent reservoirs, the oscillations of the piston 8 will result in a compression of the air at 4 and rarefaction of the same at 5. Obviously, the valvular channels being turned the other way, as indicated by dotted lines in the lower part of the figure, the opposite will take place. The devices in the piston have been shown merely by way of suggestion and can be dispensed with. Each of the chambers 15 and 16 being connected to two conduits as illustrated, the vibrations of a solid piston as 8 will have the same effect and the machine will then be a double acting pump or compressor. It is likewise unessential that the medium should be admitted to the cylinder through such devices for in certain instances ports, alternately closed and opened by the piston, may serve the purpose. As a matter of course, this novel method of propelling fluids can be extended to multistage working in which case a number of pistons will be employed, preferably on the same shaft and of different diameters in conformity with well established principles of mechanical design. In this way any desired ratio of compression or degree of rarefaction may be attained.

Fig. 4 exemplifies a particularly valuable application of the invention to which reference has been made above. The drawing shows in vertical cross section a turbine which may be of any type but is in this instance one invented and described by me and supposed to be familiar to engineers. Suffice it to state that the rotor 21 of the same is composed of flat plates which are set in motion through the adhesive and viscous action of the working fluid, entering the system tangentially at the periphery and leaving it at the center. Such a machine is a thermodynamic transformer of an activity surpassing by far that of any other prime mover, it being demonstrated in practice that each single disk of the rotor is capable of performing as much work as a whole bucket-wheel. Besides, a number of other advantages, equally important, make it especially adapted for operation as an internal combustion motor. This may be done in many ways, but the simplest and most direct plan of which I am aware is the one illustrated here. Referring again to the drawing, the upper part of the turbine casing 22 has bolted to it a separate casting 23, the central cavity 24 of which forms the combustion chamber. To prevent injury through excessive heating a jacket 25 may be used, or else water injected, and when these means are objectionable recourse may be had to air cooling, this all the more readily as very high temperatures are practicable. The top of casting 23 is closed by a plate 26 with a sparking or hot wire plug 27 and in its sides are screwed two valvular conduits communicating with the central chamber 24. One of these is, normally, open to the atmosphere while the other connects to a source of fuel supply as a gas main 28. The bottom of the combustion chamber terminates in a suitable nozzle 29 which consists of separate piece of heat resisting material. To regulate the influx of the explosion constituents and secure the proper mixture the air and gas conduits are equipped, respectively, with valves 30 and 31. The exhaust openings 32 of the rotor should be in communication with a ventilator, preferably carried on the same shaft and of any suitable construction. Its use, however, while advantageous, is not indispensable the suction produced by the turbine rotor itself being, in some cases at least, sufficient to insure proper working. This detail is omitted from the drawing as unessential to the understanding.

But a few words will be needed to make clear the mode of operation. The air valve 30 being open and sparking established across terminals 27, the gas is turned on slowly until the mixture in the chamber 24 reaches the critical state and is ignited. Both the conduits behaving, with respect to efflux, as closed valves, the products of combustion rush out through the nozzle 29 acquiring still greater velocity by expansion and, imparting their momentum to the rotor 21, start it from rest. Upon the subsidence of the explosion the pressure in the chamber sinks below the atmospheric owing to the pumping action of the rotor or ventilator and new air and gas is permitted to enter, cleaning the cavity and channels and making up a fresh mixture which is detonated as before, and so on, the successive impulses of the working fluid producing an almost continuous rotary effort. After a short lapse of time the chamber becomes heated to such a degree that the ignition device may be shut off without disturbing the established régime. This manner of starting the turbine involves the employment of an unduly large combustion chamber which is not commendable from the economic point of view, for not only does it entail increased heat losses but the explosions cannot be made to follow one another with such rapidity as would be desirable to insure the best valvular action. When the chamber is small an auxiliary means for starting, as compressed air, may be resorted to and a very quick succession of explosions can then be obtained. The frequency will be the greater the stronger the suction, and may, under certain conditions, reach hundreds and even thousands per second. It scarcely need be stated that instead of one several explosion chambers may be used for cooling purposes and also to increase the number of active pulses and the output of the machine.

Apparatus as illustrated in Fig. 4 presents the advantages of extreme simplicity, cheapness and reliability, there being no compressor, buckets or troublesome valve mechanism. It also permits, with the addition of certain well-known accessories, the use of any kind of fuel and thus meets the pressing necessity of a self-contained, powerful, light and compact internal combustion motor for general work. When the attainment of the highest efficiency is the chief object, as in machines of large size, the explosive constituents will be supplied under high pressure and provision made for maintaining a vacuum at the exhaust. Such arrangements are quite familiar and lend themselves so easily to this improvement that an enlargement on this subject is deemed unnecessary.

The foregoing description will readily suggest to experts modifications both as regards construction and application of the device and I do not wish to limit myself in these respects. The broad underlying idea of the invention is to permit the free passage of a fluid through a channel in the direction of the flow and to prevent its return through friction and mass resistance, thus enabling the performance of valve functions without any moving parts and thereby extending the scope and usefulness of an immense variety of mechanical appliances.

I do not claim the methods of and apparatus for the propulsion of fluids and thermodynamic transformation of energy herein disclosed, as these will be made subjects of separate applications.

I am aware that asymmetrical conduits have been constructed and their use proposed in connection with engines, but these have no similarity either in their construction or manner of employment with my valvular conduit. They were incapable of acting as valves proper, for the fluid was merely arrested in pockets and deflected through 90°, this result having at best only 25% of the efficiency attained in the construction herein described. In the conduit I have designed the fluid, as stated above, is deflected in each cycle through 360°, and a co-efficient approximating 200 can be obtained so that the device acts as a slightly leaking valve, and for that reason the term "valvular" has been given to it in contrast to asymmetrical conduits, as heretofore proposed, which were not valvular in action, but merely asymmetrical as to resistance.

Furthermore, the conduits heretofore constructed were intended to be used in connection with slowly reciprocating machines, in which case enormous conduit-length would be necessary, all this rendering them devoid of practical value. By the use of an effective valvular conduit, as herein described, and the employment of pulses of very high frequency, I am able to condense my apparatus and secure such perfect action as to dispense successfully with valves in numerous forms of reciprocating and rotary engines.

The high efficiency of the device, irrespective of the character of the pulses, is due to two causes: first, rapid reversal of direction of flow and, second, great relative velocity of the colliding fluid columns. As will be readily seen each bucket causes a deviation through an angle of 180°, and another change of 180° occurs in each of the spaces between two adjacent buckets. That is to say, from the time the fluid enters or leaves one of the recesses to its passage into, or exit from, the one following a complete cycle, or deflection through 360°, is effected. Observe now that the velocity is but slightly reduced in the reversal so that the incoming and deflected fluid columns meet with a relative speed, twice that of the flow, and the energy of their impact is four times greater than with a deflection of only 90°, as might be obtained with pockets such as have been employed in asymmetrical conduits for various purposes. The fact is, however, that in these such deflection is not secured, the pockets remaining filled with comparatively quiescent fluid and the latter following a winding path of least resistance between the obstacles interposed. In such conduits the action cannot be characterized as "valvular" because some of the fluid can pass almost unimpeded in a direction opposite to the normal flow. In my construction, as above indicated, the resistance in the reverse may be 200 times that in the normal direction. Owing to this a comparatively very small number of buckets or elements is required for checking the fluid. To give a concrete idea, suppose that the leak from the first element is represented by the fraction $\frac{1}{X}$, then after the $n$th bucket is traversed, only a quantity $\left(\frac{1}{X}\right)^n$ will escape and it is evident that X need not be a large number to secure a nearly perfect valvular action.

What I claim is:

1. A valvular conduit having interior walls of such conformation as to permit the free passage of fluid through it in the direction of flow but to subject it to rapid reversals of direction when impelled in the opposite sense and thereby to prevent its return by friction and mass resistance.

2. A valvular conduit composed of a closed passageway having recesses in its walls so formed as to permit a fluid to pass freely through it in the direction of flow, but to subject it to rapid reversals of direction when impelled in an opposite sense and thereby interpose friction and mass resistance to the return passage of the same.

3. A valvular conduit composed of a tube or passageway with rigid interior walls formed with a series of recesses or pockets with surfaces that reverse a fluid tending to flow in one direction therein and thereby check or prevent flow of the fluid in that direction.

4. A valvular conduit with rigid interior walls of such character as to offer substantially no obstacle to the passage through it of fluid impulses in one direction, but to subject the fluid to rapid reversals of direction and thereby oppose and check impulses in the opposite sense.

5. A valvular conduit with rigid interior walls formed to permit fluid impulses under pressure to pass freely through it in one direction, but to subject them to rapid reversals of direction through 360° and thereby check their progress when impelled in the opposite sense.

6. A valvular conduit with rigid interior walls which permit fluid impulses to flow through it freely in one direction, formed at a plurality of points to reverse such fluid impulses when impelled in the opposite direction and check their flow.

7. A valvular conduit with rigid interior walls having pockets or recesses, and transversely inclined intermediate baffles to permit the free passage of fluid impulses in one direction but to deflect and check them when impelled in the opposite direction.

In testimony whereof I affix my signature.

NIKOLA TESLA.